United States Patent Office

3,427,261
Patented Feb. 11, 1969

---

3,427,261
AROMATIC POLYMERS
Hans R. Meyer, Kilchberg, Switzerland, assignor to
W. R. Grace & Co., New York, N.Y., a corporation
of Connecticut
No Drawing. Filed Mar. 29, 1966, Ser. No. 538,205
U.S. Cl. 260—2          5 Claims
Int. Cl. C08g 33/00

ABSTRACT OF THE DISCLOSURE

This invention relates to a process for preparing a polymer having the formula:

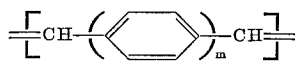

where $m$ has one of the values 1 and 2, which comprises reacting a halide of the formula:

where Hal is a member of the halogen group consisting of chlorine, bromine and iodine, with a member of the alkali metal group consisting of an alkali metal hydroxide and an alkali metal alkoxide, the mole ratio of the alkali metal group member to the halogen group member being 1 to 3:1 respectively in an inert diluent medium at a temperature in the range of about 0° to 250° C. The aforestated unsaturated polymer can be reduced to the corresponding saturated polymer by nascent hydrogen.

---

This invention relates to aromatic polymers and their preparation.

Poly-p-xylylindene

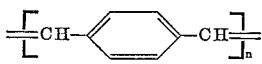

has been described by Hoeg et al. (Polymer Letters 2, 697 (1964)), who obtained it by the action of sodamide on p-xylylene dichloride in liquid ammonia.

Poly-p-xylylene

is also known and has been described, for example, in British patent specification No. 807,196. Because, inter alia, of its resistance to high temperatures, this polymer has already attracted commercial interest.

The present invention provides a process for the preparation of a polymer consisting of units of formula:

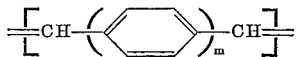

where $m$ is 1 or 2, which comprises reacting a halide of formula:

where Hal is chlorine, bromine, or, less preferably, iodine, with an alkali metal hydroxide or alkoxide in an inert diluent medium.

In accordance with a feature of the invention, the unsaturated polymer so obtained is reduced to give a polymer consisting of units of the formula:

where $m$ is 1 or 2, hereinafter referred to as the "saturated" polymer.

The first reaction appears to proceed via the intermediate formation of a polymer containing units of formula:

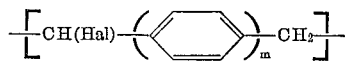

as the first formed product contains halogen. However, the use of more vigorous reaction conditions or a longer reaction time gives a halogen-free product. As compared with the prior art processes described in the publications mentioned above, this process is simpler to operate, and, in its preferred form, gives a product which is purer (as evidenced by elemental analysis), shows a higher degree of ethylenic unsaturation (as established by bromination and infrared analysis), and is less crosslinked than prior polymers of the same basic structure.

The unsaturated polymers are colored yellow or orange (depending on the degree of unsaturation) and fluoresce in ultraviolet light. They are very stable to heat. They may be used in pigments and can be made into shaped articles, e.g., by the sintering techniques used with other insoluble, infusible polymers such as polytetrafluoroethylene. Preferably, however, they are converted into the saturated polymers by reduction. The latter are useful in the production of shaped articles, e.g., fibres and films, which are chemically inert and resistant to high temperatures. The two stage process of the invention is simple to operate and gives a better quality product than the known methods mentioned above for producing such saturated polymers.

The reaction of the dihalide with the hydroxide or alkoxide may be carried out at any temperature from 0° to 250° C., the best temperature depending on the precise inert diluent used. Thus, with a highly polar solvent such as dimethylsulphoxide which is able to form unstable transient trialkyloxosulphonium salts with the halomethyl compounds, a temperature of 20–40° C. is preferred. With other highly polar solvents, e.g., dimethylformamide, a range of 40–60° C. gives good results, while with less polar solvents, e.g., t-butanol and dioxane, 80–120° C. is the best range. Basic polar solvents such as dimethylaniline can also be used. Diluents less polar than these are not generally so satisfactory but they can be employed. Thus, the reaction may be carried out in refluxing xylene.

The amount of hydroxide or alkoxide used is preferably 1 to 3 moles per halomethyl group, a small excess of about 10% over the theoretical giving good results. Alkoxides are preferred to hydroxides since they can more readily be dissolved in the diluent medium and do not permit the formation of benzyl ether—an unwanted side reaction when alkali metal hydroxides are used. The more active potassium alkoxides are generally preferred to sodium alkoxides. It has been found especially convenient to prepare potassium t-butoxide in situ in t-butanol and to add to it a solution of the dihalide in preferably an equal volume of dimethylsulphoxide. This reaction mixture is then heated at about 100°C. to eliminate the residual halogen from the polymer precipitated.

When the reaction is carried out with a solid hydroxide, the latter should be very finely divided so as to present as large a surface as possible to the solution of dihalide.

The end of the reaction may be ascertained by taking a small sample of the reaction mixture, filtering it, and heating it with more of the hydroxide or alkoxide. In no precipitate of polymer forms, the reaction is complete.

The preferred halide starting materials are $\alpha,\alpha'$-dibromo-p-xylene (p-xylylene dibromide), $a,a'$-dichloro-p-xylene, 4,4'-bis(bromomethyl) diphenyl, and 4,4'-bis(chloromethyl)diphenyl.

The unsaturated polymer produced, usually in the form of a fine powder, is isolated by, filtration and washing to remove the other constituents of the reaction mixture.

As already stated, it is preferably reduced to a saturated polymer consisting of units of the formula:

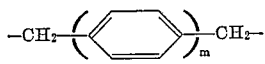

where $m$ is 1 or 2. This reduction is best carried out with an alkali metal, e.g., sodium, in liquid ammonia, under conditions previously proposed for reductions using this reagent. Thus, the unsaturated polymer may be stirred with an excess of sodium in solution in liquid ammonia at −33° C., while ethanol is slowly added. The nascent hydrogen reduces the unsaturated polymer to the corresponding saturated polymer.

The following Examples illustrate the invention. All parts and percentages used herein are by weight unless otherwise specified.

EXAMPLE 1

3.5 g. (0.088 mole) of potassium metal are dissolved in 70 ml. of anhydrous t-butanol by agitating the mixture under a nitrogen atmosphere, and finally refluxing the mixture. To this solution, a solution of 7.0 g. of α,α′-dichloro-p-xylene (0.04 mole) in 70 ml. of dimethylsulphoxide is added with stirring in 10 minutes, maintaining the temperature at 40°C. by slight external cooling. A yellow precipitate is formed almost instantaneously. The mixture is heated at 100° C. for 20 hours, and the yellow solid collected by filtration. It is washed thoroughly with several portions of ethanol and water until the filtrate is neutral and free of chloride ions. After repeated extractions with boiling 50% aqueous ethanol, and then ethanol, 2.65 g. (65%) of an orange-yellow polymer is obtained which is practically infusible and insoluble in boiling Aroclor 1248 or benzyl benzoate.

*Analysis.*—Calcd. for $C_8H_6$: C, 94.08%; H, 5.92%
Found: C, 93.85%; H, 5.70%; Cl, 0.63.

The chlorine content corresponds to approximately one chlorine atom for each 55 monomer units.

Bromination of a polymer sample in chloroform at room temperature for 18 hours yields a white product containing 55.5% of bromine, compared with 61.1% for the—$(CHBr-C_6H_4-CHBr)$— unit. This corresponds to a degree of ethylenic unsaturation of 91%. Infrared spectrophotometric analysis shows the ethylenic unsaturation as a strong band at 960 cm.$^{-1}$, which is the most intensive absorption occurring in the spectrum from 4000 to 400 cm.$^{-1}$.

An 0.2 g. sample of the product is reduced with 0.4 g. of sodium in liquid ammonia at −33° C. by addition of 1.2 ml. of ethanol over 6 hours. A white resin, M.p. 400–410°C., is obtained having an infrared spectrum almost identical with that of poly-p-xylylene, prepared as described in British specification No. 807,196.

A 0.2 g. sample finely triturated and suspended in 20 ml. of carbon tetrachloride is nitrated by introducing a stream of nitrogen dioxide and nitric oxide (prepared by the addition of water to technical nitrosylsulphuric acid) at room temperature. The resulting cream-colored solid dissolves in boiling nitrobenzene and benzyl benzoate. This is believed to be an indication of an absence of crosslinking.

EXAMPLE 2

A 3-necked flask fitted with stirrer and therometer is charged with a solution of 8.75 g. (0.05 mole) of α,α′-dichloro-p-xylene in 50 ml. dimethylsulphoxide and 8.75 g. of powdered 92% sodium hydroxide. The mixture is stirred vigorously for 48 hours at room temperature, though there is a transient increase of about 10° C. caused by the exothermic reaction. During this time, the poly-p-xylidene is formed as a suspended yellow solid. It is collected by filtration, washed with ethanol and water, and leached repeatedly with boiling aqueous 50/ ethanol until the filtrate is neutral. After repeated extractions with boiling ethanol, and drying, 4.7 g. (92% based on the pure xylylindene structure) of a fluffy, bright yellow product, infusible and insoluble for the most part in boiling Aroclor 1248 and benzyl benzoate, are obtained. It contains 14.7% chlorine by elemental analysis.

EXAMPLES 3–27

Except for the different reaction conditions set out in the table, examples 3–9, 15–17, 22 and 26 were carried out by the procedure of Example 2 and Examples 10–14, 18–21, 23–25 and 27 were carried out by the procedure of Example 1. In Example 8 a solid homogeneous mixture of the reactant is heated above the melting point of the α,α′-dichloro-p-xylene. In Example 5, the water formed is azeotropically removed throughout the reaction. The potassium hydroxide used generally is of 86% purity as determined by titration. All the yields are based on the pure xylylidene structure.

Any one of the polymers obtained may be reduced in the manner described in Example 1 to give the corresponding saturated polymer.

TABLE

| Ex. | Bis-halomethyl compound | Equivalents of alkali per halo-methyl group | Solvent | Temperature, °C. | Time (hours) | Polymer Yield, Percent | Color | Halogen content |
|---|---|---|---|---|---|---|---|---|
| 3 | α,α′-dichloro-p-xylene | 2 NaOH | Dimethylaniline [1] | 100 | 24 | 80 | Yellow | 3.0% Cl. |
| 4 | do | 2 NaOH | Dimethylformamide | 50 | 7 | 69 | Orange-yellow | 5.4% Cl. |
| 5 | do | 2 KOH | Xylene | 140 | 22.5 | 75 | Light yellow | 16.0% Cl. |
| 6 | do | 2 KOH | Dioxane | 101 | 17.5 | 67 | do | 18.3% Cl. |
| 7 | do | 2 KOH | t-Butanol | 82 | 2.5 | 56 | Yellow [4] | 12.4% Cl. |
| 8 | do | 2 KOH | do | [3] 100 | 1 | 85 | Orange-yellow | 7.6% Cl. |
| 9 | do | 2.5 KOH | Dimethylsulphoxide | 20 | 20 | 75 | do | 7.6% Cl. |
| 10 | do | 1.1 KOC₄H₉ | t-Butanol | 82 | 0.5 | 87 | Yellow | 19.4% Cl. |
| 11 | do | 2 KOC₄H₉ | do | 82 | 47 | 38 | do | 8.2% Cl. |
| 12 | do | 1.1 KOC₄H₉ | t-Butanol-dimethylsulphoxide 1:1. | 100 | 2 | 54 | Orange-yellow [4] | 1.1% Cl. |
| 13 | do | 1.1 KOC₄H₉ | do | 40 | 21 | 66 | do | 3.8% Cl. |
| 14 | do | 1.1 KOC₄H₉ | Dimethylsulphoxide | 100 | 17 | 59 | do | 0.26% Cl. |
| 15 | do | 1.7 KOH (35% aqueous) | do | 25 | 21 | 100 | Yellow [4] | 8.2% Cl. |
| 16 | do | 2 KOH (45% aqueous) | do | 25 | 23 | 93 | do | 8.1% Cl. |
| 17 | do | 2 KOH (55% aqueous) | do | 25 | 22 | 97 | do | 9.0% Cl. |
| 18 | do | 1.1 KOC₄H₉ | t-Butanoldimethylsulphoxide. | 25 | 66 | 80 | Orange-yellow | 3.8% Cl. |
| 19 | do | 1.1 KOC₄H₉ | do | 100 | 20 | 65 | Orange-yellow [4] | 0.63% Cl. |
| 20 | do | 1.1 KOC₄H₉ | Dimethylsulphoxide | 100 | 18 | 59 | do | 0.26% Cl. |
| 21 [5] | do | 1.1 KOC₄H₉ | t-Butanol-dimethylsulphoxide. | 25 | 2 | 64 | Yellow to orange [6] | 8.11% Cl. |
| 22 | α,α′-dibromo-p-xylene | 2 NaOH | Dimethylsulphoxide | [3] 100–115 | 0.25 | [3] 73 | Orange-yellow | 0.9% Br. |
| 23 | do | 2 KOC₄H₉ | t-Butanol | 82 | 19 | 39 | Yellow | 9.4% Br. |

See footnotes at end of table.

| Ex. | Bis-halomethyl compound | Equivalents of alkali per halo-methyl group | Solvent | Temperature, °C. | Time (hours) | Polymer Yield, Percent | Polymer Color | Polymer Halogen content |
|---|---|---|---|---|---|---|---|---|
| 24 | α,α'-dibromo-p-xylene | 1.1 KOC₄H₉ | t-Butanol-dimethylsulphoxide | 100 | 20 | 91 | Orange-yellow [4] | 0.1% Br. |
| 25 | do | 1.5 KOC₄H₉ | do | 90 | 20 | 85 | Orange | 0.1% Br. |
| 26 | 4,4'-(dibromomethyl)biphenyl | 2 NaOH | Dimethylsulphoxide | 20 | 26 | 83 | Pale yellow | 2.0% Br. |
| 27 | do | 1.1 KOC₄H₉ | t-Butanol-dimethylsulphoxide 1:1 | 100 | 0.2 | 34 | Pale yellow [4] | 0.6% Br. |

[1] Under nitrogen atmosphere.
[2] Internal temperature raised above 100° C. owing to exothermic reaction.
[3] After extraction with boiling benzene.
[4] Nitrated polymer soluble in nitrobenzene or benzyl benzoate.
[5] The KOC₄H₉ solution was dropped into the dihalide solution.
[6] Inhomogeneous product.

What is claimed is:

1. A process for preparing a polymer having the formula:

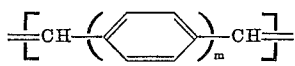

where $m$ has one of the values 1 and 2, which comprises reacting a halide of the formula:

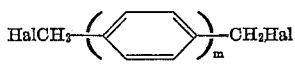

where Hal is a member of the halogen group consisting of chlorine, bromine and iodine, with a member of the alkali metal group consisting of an alkali metal alkoxide and an alkali metal hydroxide, the mole ratio of the alkali metal group member to the halogen group member being 1 to 3:1 respectively in an inert diluent medium at a temperature in the range of about 0° to 250° C.

2. The process according to claim 1 wherein the polymer having the formula:

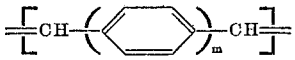

where $m$ has one of the values 1 and 2, is reduced with hydrogen to a saturated polymer having the formula:

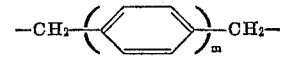

3. A process according to claim 2 in which the reduction is carried out by the addition of ethanol to an alkali metal in liquid ammonia.

4. A process according to claim 1 wherein the inert diluent medium is a member of the group consisting of dimethylsulfoxide, dimethylformamide, t-butanol, dioxane, dimethylaniline and xylene.

5. A process according to claim 1 wherein the halide reactant is a member of the group consisting of α,α'-dibromo-p-xylene; α,α'-dichloro-p-xylene; 4,4'-bis(bromomethyl)diphenyl; and 4,4'-bis(chloromethyl)diphenyl.

References Cited

UNITED STATES PATENTS

| | | | |
|---|---|---|---|
| 2,757,146 | 7/1956 | Fawcett | 260—2 |
| 2,999,820 | 9/1961 | Young | 260—2 |
| 3,110,687 | 11/1963 | Smith | 260—2 |
| 3,235,516 | 2/1966 | Leonard | 260—2 |
| 3,342,754 | 9/1967 | Gorham | 260—2 |

OTHER REFERENCES

McDonald et al.: "Jour. American Chem. Soc.," vol. 82 (September 1960), pp. 4669–4671.

Hoeg et al.: "Polymer Letters," vol. 2 (July 1964), pp. 697–701.

Gilch et al.: "Chemical Abstracts," vol. 65 (1966), col. 3978–9.

SAMUEL H. BLECH, *Primary Examiner.*

U.S. Cl. X.R.

260—900, 31.2, 32.4, 32; 252—301.2